(12) United States Patent
Brücher et al.

(10) Patent No.: US 11,713,989 B2
(45) Date of Patent: Aug. 1, 2023

(54) ULTRASONIC GAS FLOW MEASURING DEVICE AND METHOD FOR EVALUATING USEFUL SIGNALS OF A TRANSDUCER IN A CONDUCTIVE PIPE

(71) Applicant: Rosen Swiss AG, Stans (CH)

(72) Inventors: Martin Brücher, Emsbüren (DE); Rüdiger Bauernschmitt, Linkenheim-Hochstetten (DE); Natalia Rodriguez, CR Enschede (NL)

(73) Assignee: Rosen Swiss AG, Stans (CH)

( * ) Notice: Subject to any disclaimer, the term of this patent is extended or adjusted under 35 U.S.C. 154(b) by 186 days.

(21) Appl. No.: 16/982,976

(22) PCT Filed: Mar. 21, 2019

(86) PCT No.: PCT/EP2019/057142
§ 371 (c)(1),
(2) Date: Sep. 21, 2020

(87) PCT Pub. No.: WO2019/180168
PCT Pub. Date: Sep. 26, 2019

(65) Prior Publication Data
US 2021/0018349 A1 Jan. 21, 2021

(30) Foreign Application Priority Data

Mar. 21, 2018 (DE) ..................... 10 2018 106 736.4
Sep. 14, 2018 (DE) ..................... 10 2018 122 584.9

(51) Int. Cl.
*G01F 1/66* (2022.01)
*G01F 1/667* (2022.01)

(52) U.S. Cl.
CPC .............. *G01F 1/662* (2013.01); *G01F 1/667* (2013.01)

(58) Field of Classification Search
None
See application file for complete search history.

(56) References Cited

U.S. PATENT DOCUMENTS

| 4,838,127 A | 6/1989 | Herremans et al. |
| 2014/0137662 A1* | 5/2014 | Heinks ..................... G01F 1/66 |
| | | 73/861.28 |

(Continued)

FOREIGN PATENT DOCUMENTS

| CN | 106153132 A | 11/2016 |
| DE | 102012019217 A1 | 4/2014 |

(Continued)

OTHER PUBLICATIONS

International Search Report for International application No. PCT/EP2019/057142 dated Jul. 26, 2019; 2 pgs.

*Primary Examiner* — Harshad R Patel
(74) *Attorney, Agent, or Firm* — Alix, Yale & Ristas, LLP

(57) ABSTRACT

A method for noninvasive determination of the flow or the flow rate in an electrically conductive object, through which a gaseous medium flows, by an acoustic flow meter, wherein an emitting transducer is arranged on the object wall—and a receiving transducer is arranged spaced apart in the longitudinal direction of the object on the object wall, an ultrasonic wave is generated in the object by the emitting transducer, which is partially coupled as a longitudinal wave into the medium, and a useful signal, which at least partially results due to the longitudinal wave, is detected by the receiving transducer, the flow rate is determined from the useful signal via an evaluation device, the emitting transducer is arranged in a first position in the circumferential direction around a longitudinal axis of the object and the receiving transducer is arranged in a second position, varied in relation to the first position around the longitudinal axis, (Continued)

outside the main beam of the ultrasonic wave, and the width of the main beam is restricted to a sector between two contact points of a sensor mechanism.

23 Claims, 8 Drawing Sheets

(56) References Cited

U.S. PATENT DOCUMENTS

2015/0260561 A1　9/2015　Twerdowski et al.
2016/0320219 A1　11/2016　Hellevang et al.

FOREIGN PATENT DOCUMENTS

WO　2011078691 A2　6/2011
WO　2018017902 A2　1/2018

* cited by examiner

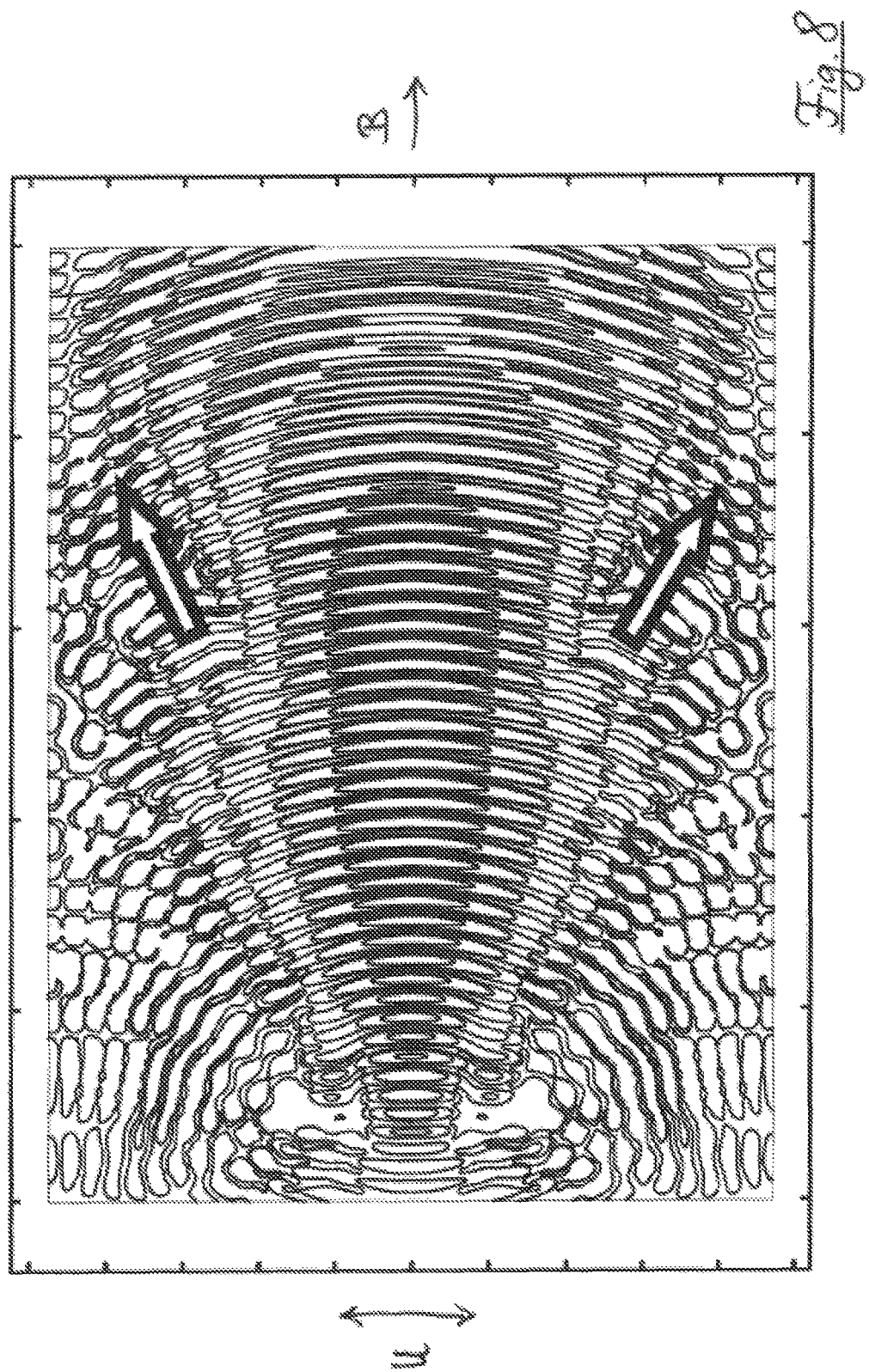

ULTRASONIC GAS FLOW MEASURING DEVICE AND METHOD FOR EVALUATING USEFUL SIGNALS OF A TRANSDUCER IN A CONDUCTIVE PIPE

BACKGROUND

The present invention relates to a method for noninvasive determination of the flow or the flow rate in an electrically conductive object through which a gaseous medium flows, in particular in a pipe or a pipeline, by means of an acoustic flow meter.

In conventional, noninvasive, acoustic flow meters, an ultrasonic wave, formed in particular as a Lamb wave, which is partially coupled as a longitudinal wave into the medium, is generated in the object by an emitting transducer arranged on or close to the object wall. A useful signal, which at least partially results due to the longitudinal wave, is detected by a receiving transducer spaced apart in the longitudinal direction of the object from the emitting transducer and arranged on or close to the object wall. The flow or the flow rate of the medium is determined from the useful signal via an evaluation device.

With gaseous media, such measurements are problematic since due to the poor acoustic coupling between the material of the object, in particular the pipe steel, and the gaseous medium, only a fraction of the ultrasonic wave generated by the emitting transducer is coupled into the medium. This results in a relatively small useful signal, which in general is less by a factor of approximately 50 to 10,000 than the signal generated by the main beam of the ultrasonic wave. Therefore, the receiving transducer generally has to be strongly amplified to detect the useful signal, whereby interference signals arise upon switching on the amplification ("gain change"), which make evaluation of the measurement more difficult. Furthermore, the useful signal can be distorted by correlated noise, which results due to reflections of the ultrasonic wave on mechanical structures, such as flaws, weld seams, and above all contact points of a sensor mechanism of the flow meter.

SUMMARY OF THE INVENTION

The object of the present invention is therefore to design a method for acoustic flow rate measurement which enables improved measurement or determination of the flow of a gaseous medium or the flow rate. Furthermore, it is the object of the present invention to design an improved acoustic flow meter, which enables an improved measurement or determination of the flow or the flow rate of a gaseous medium.

In the method according to the invention for noninvasive determination of the flow or the flow rate in an electrically conductive object through which a gaseous medium flows, in particular in a pipe or a pipeline, by means of an acoustic flow meter, an emitting transducer of the flow meter is arranged in the circumferential direction around a longitudinal axis of the object on or close to the object wall and a receiving transducer of the flow meter is arranged spaced apart in the longitudinal direction of the object on or close to the object wall. An ultrasonic wave, formed in particular as a Lamb wave, which is partially coupled as a longitudinal wave into the medium, is generated in the object by means of the emitting transducer. A useful signal, which results at least partially due to the longitudinal wave, is detected by the receiving transducer, wherein the flow or the flow rate is determined from the useful signal via an evaluation device.

The emitting transducer is arranged in the circumferential direction around a longitudinal axis of the object in a first position and the receiving transducer is arranged in a second position, which is varied in relation to the first position around the longitudinal axis, outside the main beam of the ultrasonic wave. The width of the main beam of the ultrasonic wave is restricted to a sector between two contact points of a sensor mechanism, via which the flow meter is fastened and in particular clamped on the object. In particular, the contact points are arranged behind the receiving transducer with respect to the main beam and in the propagation direction of the ultrasonic wave. Preferably, no contact points of the sensor mechanism are arranged between emitting and receiving transducers with respect to a longitudinal axis of the object.

Due to the use of this approach, generation of correlated noise due to reflections at contact points of the sensor mechanism is greatly inhibited, whereby the useful signal, which is smaller by several orders of magnitude, can be detected and evaluated better. Moreover, the main beam of the ultrasonic wave is guided past the receiving transducer and is thus not directly detected. The significantly smaller useful signal can therefore be detected and evaluated better and without a strong change of the amplification. This results in improved determination of the flow or the flow rate of the gaseous medium.

Emitting or receiving transducers can contact the object wall or can be arranged without contact close to the object wall. In this case, emitting or receiving transducers are arranged close to the object wall if they can generate an ultrasonic wave in the object wall or detect a useful signal, respectively.

The width of the main beam is defined by its bundle boundary extending laterally to the propagation direction of the ultrasonic wave, at which the amplitude of the main beam drops to a value which is preferably at most 10% of the maximum amplitude. In individual exemplary embodiments, this value can possibly be at most 30%, preferably at most 50% of the maximum amplitude.

A region of the object wall is referred to as a "sector". For example, in a tubular object, from a perspective in the longitudinal direction of the object, this is the section of the object wall which is bounded in terms of a "circular arc" between two lines each originating from the longitudinal axis of the object and extending through the object wall and perpendicular thereto.

Vapor, in particular water vapor, is also considered to be a "gaseous medium". The gaseous medium can also represent a mixture of multiple media, which are in particular each gaseous.

Fastening elements, which are used to fasten emitting and/or receiving transducers and possibly further functional elements, such as magnets, magnetic coils, electronic components, etc. on the object are described as a "sensor mechanism". A housing can be part of the sensor mechanism.

Furthermore, the object is also achieved by a method wherein the emitting receiver detects at least one side lobe of the ultrasonic wave in addition to the useful signal and at least one side lobe signal is used as a reference signal in the evaluation of the useful signal to determine the flow or the flow rate.

The incorporation of at least one side lobe signal into the evaluation of the useful signal to determine the flow or the flow rate in particular enables system-related errors, such as influences of the electronics, to be minimized. This is in particular by calculating the difference between useful signal and reference signal. A more precise measurement and determination of the flow or the flow rate of the gaseous medium is thus enabled. In contrast to the main beam of the ultrasonic wave, which generates a signal which is generally approximately 50 to 10,000 times stronger than the useful signal, the side lobe signal and the useful signal move in substantially the same order of magnitude. I.e., side lobe signal and useful signal differ by only a factor greater than 0.1 and less than 10. The detection and evaluation of the signals and the determination of the flow or the flow rate can therefore be carried out more precisely. Emitting and receiving transducers and the associated electronics are designed accordingly.

According to a further embodiment of the invention, emitting and receiving transducers are designed in such a way that side lobe signal and useful signal are amplified for the evaluation, wherein the amplification factors are in the same order of magnitude. This applies in particular to side lobes of Lamb waves. Thus, for example, interfering signals which arise upon a "gain change" between two amplification factors of different orders of magnitude are avoided, whereby a better determination of the flow or the flow rate is enabled in the evaluation device. The dynamic range of the evaluation electronics can alternatively also be limited, whereby these can be implemented with little effort.

According to a further preferred design of the invention, the receiving transducer is positioned in the longitudinal direction of the object such that the amplitudes of two side lobes extending in opposite directions around the longitudinal axis of the object are superimposed at the receiving transducer. This contributes to the amplification or improved detection of the reference signal, whereby more precise determination of the flow or the flow rate is enabled.

According to a further advantageous design of the invention, the receiving transducer is positioned opposite to the emitting transducer from a perspective in the longitudinal direction of the object, i.e., emitting and receiving transducers are pivoted by 180° in relation to one another around a central longitudinal axis of the object. The receiving transducer positioned farthest away from the main beam in the circumferential direction thus receives less correlated noise generated by a main beam. Furthermore, an optimum superposition of two side lobes extending around on opposing sides of the object wall is achieved by the symmetrical arrangement, which thus provide an improved reference signal. More precise determination of the flow or the flow rate is thus possible.

In a further preferred embodiment of the invention, the width of the main beam of the ultrasonic wave is restricted to a sector width of less than 120° via a phased-array setup of the at least one emitting transducer at the height of the receiving transducer in the circumferential direction. In this way, sufficient space remains free (a sector of 240°) at the height of the receiving transducer from a perspective in the longitudinal direction to arrange the receiving transducer without direct influence by the main beam of the ultrasonic wave. In particular if the receiving transducer extends over a smaller sector than 240°, space can moreover be provided for contact points of a sensor mechanism. This results in further minimization of the correlated noise and more precise determination of the flow or the flow rate.

In general, the use of a phased-array set up is advantageous for the precise alignment of the main beam. Surprising advantages for flow measurements in gaseous media have resulted in particular due to the use of emitting and receiving transducers operating based on EMAT. In particular with an EMAT setup, as is also described hereinafter, emitting and receiving transducers can be positioned on the object wall while more or less dispensing with acoustic coupling. Both the transducers and also further magnets for generating a stationary or quasi-stationary magnetic field can be positioned on the object by the sensor mechanism.

In a further preferred design of the invention, the receiving transducer is positioned at a distance less than D/2 from the contact point of the sensor mechanism with respect to a longitudinal direction of the object, wherein D describes the external diameter of the pipe. The noise signal is thus at least partially, in particular largely, guided past the receiving transducer. This ensures a precise measurement and determination of the flow or the flow rate.

According to a further advantageous design of the invention, the center point of the receiving transducer is positioned at a distance less than 1.5*D, preferably less than 4/3*D, from the contact point of the sensor mechanism with respect to a longitudinal direction of the object, wherein D describes the external diameter of the pipe. The noise signal is thus at least partially, in particular largely, guided past the receiving transducer. This ensures a precise measurement and determination of the flow or the flow rate.

For the case in which a part of the waves reflected at the contact points is nonetheless incident on the receiving transducer, due to the distance of the receiving transducer to the contact points being selected to be as small as possible, the noise signal induced by the reflected waves arrives at the receiving transducer chronologically before the more slowly moving useful signal. In this way, a chronological overlap of the noise signal with the useful signal is prevented, which would impair a precise evaluation of the useful signal.

In a further preferred embodiment of the invention, a static or quasistatic first magnetic field is generated to generate the ultrasonic wave in the object, which interacts with a varying further magnetic field generated by the emitting transducer in the surface-proximal region of the object. Acoustically relevant couplings with the object can be minimized by such an EMAT setup, emitting and receiving transducers can be laid as meandering conductor tracks on an in particular curved pipe surface, without relevant acoustic influencing of the useful signal occurring. Emitting and receiving transducers are provided with multiple correspondingly spaced-apart conductor tracks, which can be activated differently over time, in particular to form a phased-array approach.

In particular, one pair of emitting and receiving transducers, on the one hand, and a further pair of emitting and receiving transducers, on the other hand, are arranged on the object, wherein measurement is performed both in the direction of the flow and in the opposite direction to determine the flow or the flow rate. By recording a measurement signal in each case in the direction of the flow and in the opposite direction, further influencing variables, for example the temperature of the medium, can be computationally eliminated by a comparison of the measurement signals, in particular subtraction. A precise measurement and determination of the flow or the flow rate is thus ensured.

Alternatively, a conductor arrangement is preferably used here as the emitting and/or receiving transducer, which is designed both for emitting the ultrasonic wave and also for receiving the useful signal and in particular the reference signal. Due to the use of only one conductor arrangement, possibly made up of multiple conductor tracks per emitting or receiving position, interfering influences can be avoided or minimized by a compact arrangement of emitting and receiving transducer. Furthermore, a flow meter can thus be implemented to be more compact and have lower total weight, so that the contact points of the sensor mechanism can be dimensioned smaller, which results in the minimization of correlated noise.

The emitting and/or receiving transducer is preferably operated in a frequency range of 50 kHz to 300 kHz, preferably of 100 kHz to 210 kHz. The range defines in particular the frequency of the ultrasonic wave generated by the emitting transducer in the object. A precise determination of the flow or the flow rate is possible in this frequency range.

According to the description above and below, the object stated at the outset is also achieved by an acoustic flow meter for the noninvasive determination of the flow or the flow rate in an electrically conductive object through which a gaseous medium flows, in particular in a pipe or a pipeline, and for carrying out the disclosed method. The flow meter has an emitting transducer to be positioned on or close to the object wall and a receiving transducer to be arranged on or close to the object wall. The flow meter is designed to generate an ultrasonic wave, formed in particular as a Lamb wave, in the object and to detect the useful signal and is provided with a sensor mechanism for connecting the flow meter to the object. For this purpose, the flow meter has an evaluation device, by means of which the flow or the flow rate is determinable from the useful signal. In this case, the emitting transducer is arranged in a first position in the circumferential direction around a longitudinal axis of the object and the receiving transducer is arranged in a second position, varied in relation to the first position around the longitudinal axis, outside the main beam of the ultrasonic wave, wherein the receiving transducer and the emitting transducer have a sector width less than 120°, preferably less than or equal to 90°, in particular less than 80°, with respect to a longitudinal axis of the object to be arranged between them, and contact means of the sensor mechanism, viewed in the direction of the longitudinal axis, are arranged outside the sectors spanned by the receiving transducer and emitting transducer.

Generation of correlated noise due to reflections at contact points of the sensor mechanism is greatly inhibited by this constructive design, whereby the significantly smaller useful signal can be better detected and evaluated. Moreover, the main beam of the ultrasonic wave is guided past the receiving transducer and is thus not directly detected. The significantly smaller useful signal can therefore be detected and evaluated better and without a strong change of the amplification. Due to reduced influences of the measurement electronics, this results in improved determination of the flow or the flow rate of the gaseous medium in such a way that the application becomes practicable.

According to a further advantageous design of the invention, from the emitting transducer to the receiving transducer and with respect to a longitudinal axis of the object, the contact means associated with the receiving transducer are arranged behind the receiving transducer. A configuration is thus enabled in which the intermediate space between emitting transducer and receiving transducer remains free of contact points, whereby the occurrence of interfering reflections is prevented. This permits a more precise measurement and determination of the flow or the flow rate.

In a further preferred design of the invention, the emitting and/or receiving transducer has an extension in the circumferential direction which is 3 times to 10 times the wavelength, preferably 4 times to 8 times the wavelength of the ultrasonic wave. This applies in particular to transducers having conductor tracks or conductor loops designed based on EMAT. With such a design of emitting and/or receiving transducer, the main beam of the ultrasonic wave has a low divergence, so that it can be guided optimally past the receiving transducer and in particular the contact points of the sensor mechanism. An improved determination of the flow or the flow rate can thus be achieved.

The emitting and/or receiving transducer is preferably designed corresponding to a wavelength in the range of 5 mm to 20 mm, preferably 10 mm to 16 mm. With transducers having conductor tracks or conductor loops designed based on EMAT and extending essentially in parallel, in particular the distance between two conductor track portions having the same flow direction is thus defined. A precise determination of the flow or the flow rate is possible in this wavelength range.

The extension (E) of the emitting and/or receiving transducer (2, 4) is particularly preferably 25 mm to 150 mm, preferably 40 mm to 120 mm, and a width (F) of the emitting and/or receiving transducer (2, 4) extending perpendicular to the extension (E) is 75 mm to 100 mm, preferably 85 mm. Transducers dimensioned in this manner enable easy handling and precise determination of the flow or the flow rate at the common wall thicknesses and pipe diameters.

According to a further advantageous design of the invention, the receiving transducer is positioned at a distance less than D/2 from the contact point of the sensor mechanism with respect to a longitudinal direction of the object, wherein D describes the external diameter of the pipe. The noise signal is thus at least partially, in particular largely, guided past the receiving transducer. This ensures a precise measurement and determination of the flow or the flow rate.

In a further preferred design of the invention, the center point of the receiving transducer is positioned at a distance less than 1.5*D, preferably less than 4/3*D, from the contact point of the sensor mechanism with respect to a longitudinal direction of the object, wherein D describes the external diameter of the pipe. The noise signal is thus at least partially, in particular largely, guided past the receiving transducer. This ensures a precise measurement and determination of the flow or the flow rate.

For the case in which a part of the waves reflected at the contact points is nonetheless incident on the receiving transducer, due to the distance of the receiving transducer to the contact points being selected to be as small as possible, the noise signal induced by the reflected waves arrives at the receiving transducer chronologically before the more slowly moving useful signal. In this way, a chronological overlap of the noise signal with the useful signal is prevented, which would impair a precise evaluation of the useful signal.

According to a further advantageous design of the invention, emitting and/or receiving transducers are formed by a conductor arrangement which is designed both for emitting the ultrasonic wave and also for receiving the useful signal. By measuring both in the direction of the flow and also in the opposite direction, two measurement signals are obtained, by which further influencing variables, for example the temperature of the medium, can be computationally eliminated by a comparison of the measurement signals, in particular subtraction. A precise measurement and determination of the flow or the flow rate is thus ensured.

In a further preferred design of the invention, at least one contact means forms at least one linear contact point, which extends in particular in the longitudinal direction of the object, for contact on the object. A minimal contact area of the contact means with the object is ensured by this design, so that reflections in particular of the main beam can occur only at very limited points along the object circumference, which enables a precise determination of the flow or the flow rate. In particular linear contact points extending in the longitudinal direction of the object are advantageous, which extend essentially in parallel to the main emission direction of the main beam of the ultrasonic wave, so that quasi-punctiform contact points are provided from a perspective in the propagation direction of the main beam. Reflections are thus more extensively minimized.

Alternatively or additionally, at least one contact means forms at least one punctiform contact point for contact on the object. In this case, multiple punctiform contact points can be arranged in series or in succession, for example, in the longitudinal direction of the object. Furthermore, the contact means can be formed from multiple punctiform contact points, which can be arranged in succession in the longitudinal direction of the object and adjacent in the circumferential direction of the object. Rows extending adjacent to one another can also be arranged offset with respect to one another.

Preferably, at least one contact means consists of a hard material, in particular of metal. Reflections are more extensively minimized by the "hard coupling", whereby a more precise measurement and determination of the flow or the flow rate can be achieved.

Further advantages and details of the invention can be gathered from the following description of the figures.

BRIEF DESCRIPTION OF THE DRAWINGS

In the schematic figures:

FIG. 8 shows a simulation result to illustrate a side lobe.

DETAILED DESCRIPTION

Identically or similarly acting parts are provided—if appropriate—with identical reference signs. Individual technical features of the exemplary embodiments described hereinafter can also result in refinements according to the invention with the features of the above-described exemplary embodiments.

Figure 1:
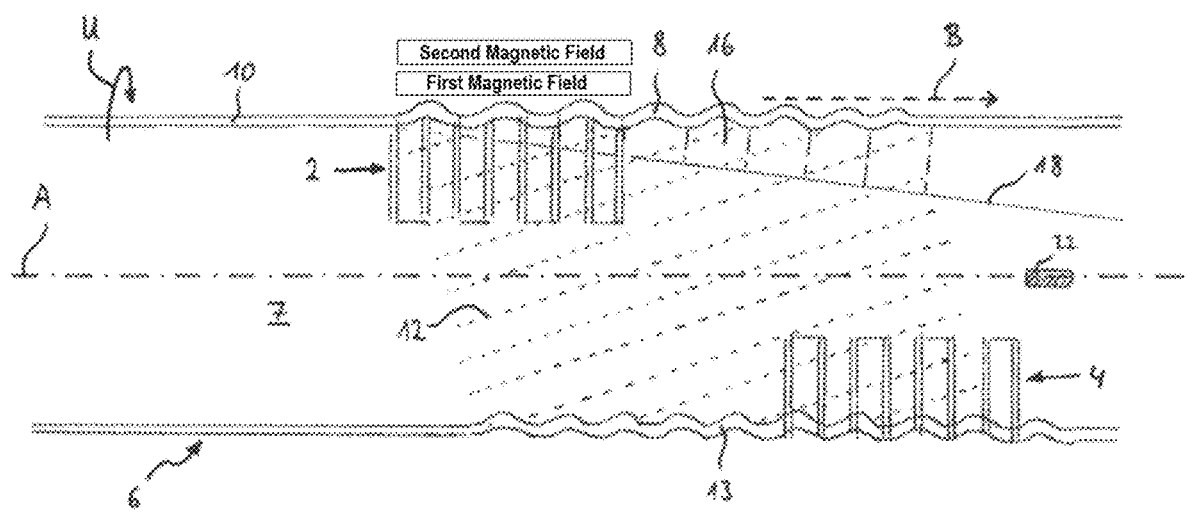
FIG. 1 shows subject matter according to the invention in a schematic illustration.
Figure 2:
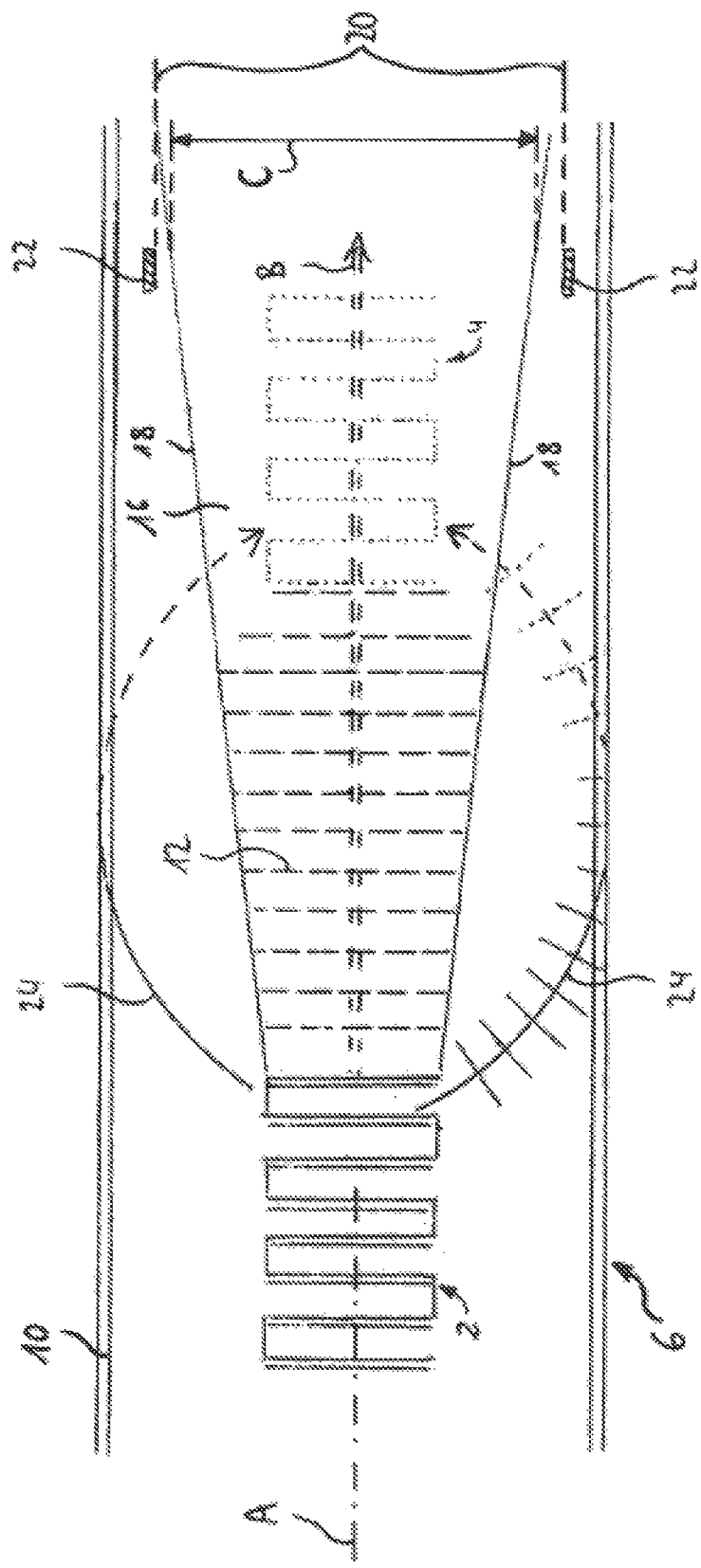
FIG. 2 shows the subject matter according to the invention from FIG. 1 in a further schematic illustration rotated by 90°.

An acoustic flow meter according to the invention is (partially) shown in FIGS. 1 and 2, having a first conductor arrangement 2 functioning as an emitting transducer and a second conductor arrangement 4 functioning as a receiving transducer, which are arranged externally on a tubular object 6, the longitudinal axis of which is identified by A and through which a gaseous medium 7 flows. The first conductor arrangement 2 and the second conductor arrangement 4 are spaced apart in the longitudinal direction of the object 6. The first conductor arrangement 2 functioning as an emitting transducer generates an ultrasonic wave 8, formed in particular as a Lamb wave, in the object wall 10, which is partially coupled as a longitudinal wave 12 into the medium 7. FIG. 1 schematically represents a first static or quasi-static magnetic field which interacts with a varying second magnetic field to generate the ultrasonic wave in a surface-proximal region of the object 6. In a region of the object wall 10 opposite to the first conductor arrangement 2, the longitudinal wave 12 is converted into a useful signal ultrasonic wave 13, formed in particular as a Lamb wave. The useful signal 14 of the useful signal ultrasonic wave 13 detected by the second conductor arrangement 4 functioning as the receiving transducer results at least partially due to the longitudinal wave 12.

The ultrasonic wave 8 has a slightly diverging main beam 16, in which a predominant part of the energy of the ultrasonic wave 8 is bundled and is transported in a propagation direction B in the object wall 10. The main beam 16 has a bundle boundary 18, from which the amplitude of the main beam 16 is 30% less than the maximum amplitude. The first conductor arrangement 2 is arranged in a first position in the circumferential direction U around the longitudinal axis A and the second conductor arrangement 4 is arranged in a second position varied in relation to the first position around the longitudinal axis A outside the main beam 16.

FIG. 2 shows the flow meter according to the invention partially and in a top view on the conductor arrangement 2 functioning as the emitting transducer. The width C of the main beam 16 is restricted to a sector 20 between two contact points 22, wherein the contact points 22 are furthermore arranged behind the second conductor arrangement 4 functioning as the receiving transducer with respect to the main beam 16 and in the propagation direction B of the ultrasonic wave 8. The receiving transducer 4 detects, in addition to the useful signal 14, two side lobes 24 of the ultrasonic wave 8 extending in opposite directions around the longitudinal axis A of the object 6, wherein at least one side lobe signal 26 is used as a reference signal in the evaluation of the useful signal 14 to determine the flow or the flow rate. Both emitting and also receiving transducer are formed having at least two conductor loops in the phased-array set up.

Figure 3:
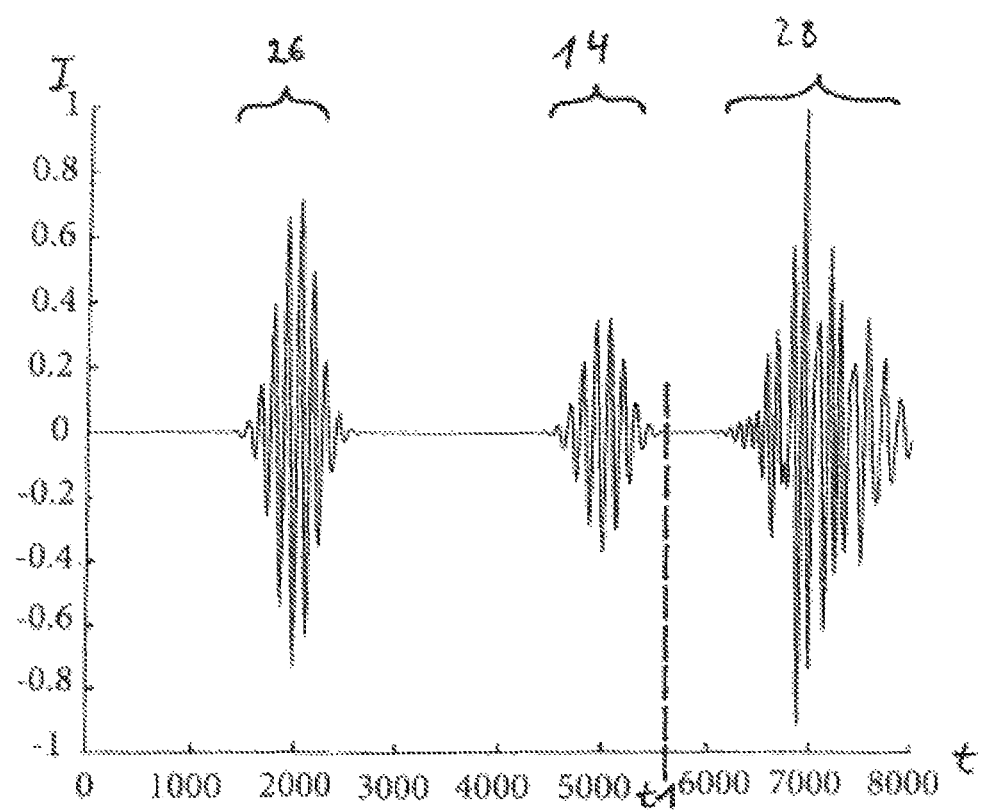
FIG. 3 shows an image having received signals of a flow meter according to the invention.

FIG. 3 shows an example of a time-resolved measurement in arbitrary units for the intensity I of the signals and the time t. The side lobe signal 26, which extends through the object wall 10 from the emitting transducer 2 to the receiving transducer 4, arrives some time before the useful signal 14, which results at least partially due to the longitudinal wave 12 coupled into the medium 7. The side lobe signal 26 is in the same order of magnitude as the useful signal 14 and therefore can serve optimally as a reference signal. A variety of systematic errors or interfering variables such as influences from the electronics can be computationally eliminated, for example, by calculating the difference between useful signal 14 and side lobe signal 26.

A noise signal 28, which predominantly arises due to reflections of the ultrasonic wave 8 at reflective structures spaced apart from the flow meter in or on the pipe, in particular welded seams, flanges, or fastening elements, is also detected by the receiving transducer 4. To guarantee an optimum measurement, it has to be ensured that the noise signal 28 only reaches the receiving transducer 4 chronologically after the decay of the useful signal 14 (approximately at the time t1).

Figure 4:
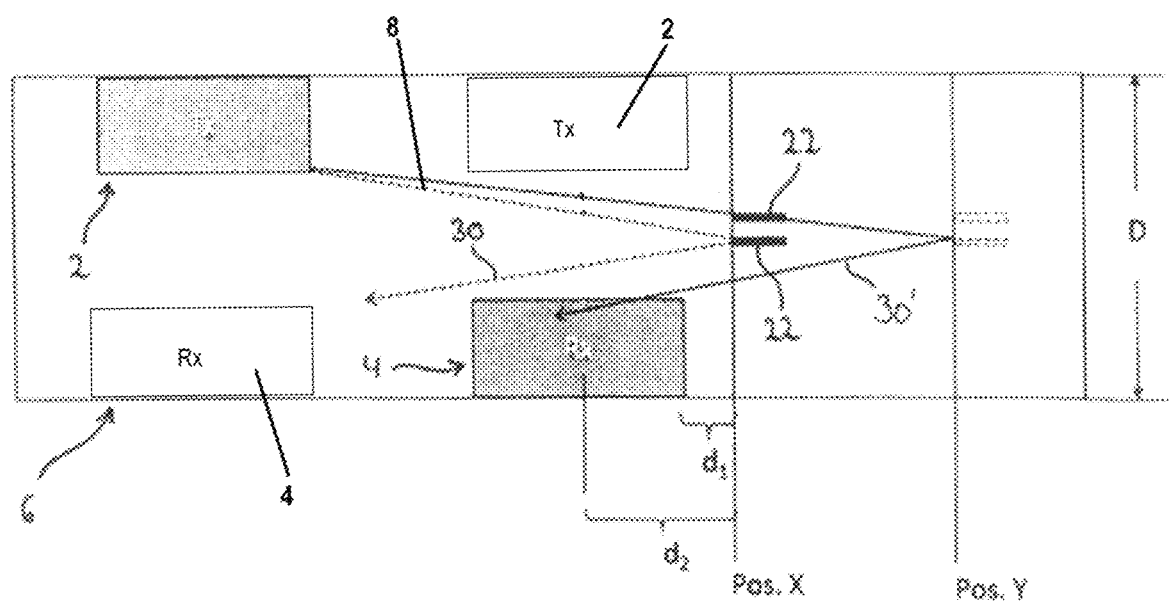
FIG. 4 shows a schematic sketch according to the invention.

In consideration of FIG. 4, the intensity of reflections which arise at the contact points 22 can be reduced by various constructive measures. On the one hand, the contact points 22 of a sensor mechanism provided for fastening the flow meter on the object 6 are arranged behind the receiving transducer 4 in the propagation direction B of the ultrasonic wave 8. Moreover, positioning and dimensioning of the receiving transducer 4 are significant. As a function of the external diameter D of the object 6, the receiving transducer 4 is positioned at a distance d1 less than D/2 from the contact point 22 with respect to a longitudinal direction of the object 6. Furthermore, the center point of the receiving transducer 4 is positioned at a distance d2 less than 1.5*D, preferably less than 4/3*D, from the contact point 22 with respect to a longitudinal direction of the object 6. Such an arrangement (position X) has the effect that at least a part of the waves 30 reflected at the contact points 22 are not incident on the receiving transducer 4 (as is the case in an alternative arrangement according to position Y for the reflected waves 30'). FIG. 4 illustrates a further pair of emitting transducer 2 and receiving transducer 4, arranged on the object 6 to measure flow in a direction opposite the flow direction.

For the case in which a part of the waves 30 reflected at the contact points 22 are nonetheless incident on the receiving transducer 4, due to the distance d1, d2 being selected to be as small as possible, the noise signal induced by the reflected waves 30 arrives at the receiving transducer 4 chronologically before the slower-moving useful signal 14. In this manner, a chronological overlap of this noise signal with the useful signal 14 is prevented, which would negatively affect a precise evaluation of the useful signal 14.

Figure 5:
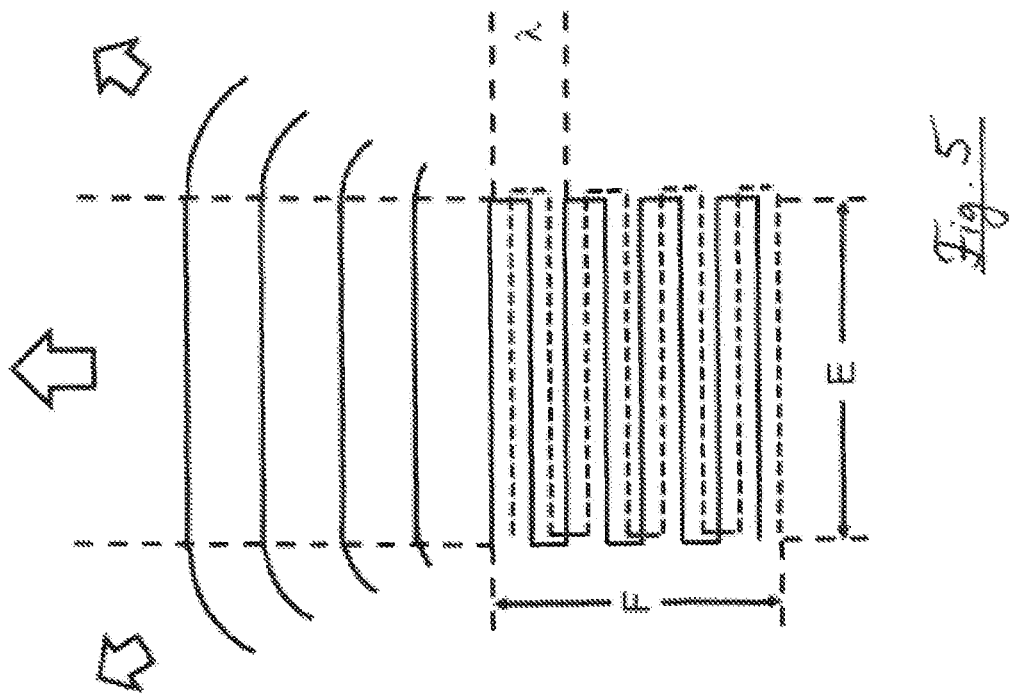
FIG. 5 shows an image of a conductor arrangement according to the invention.
Figure 5:
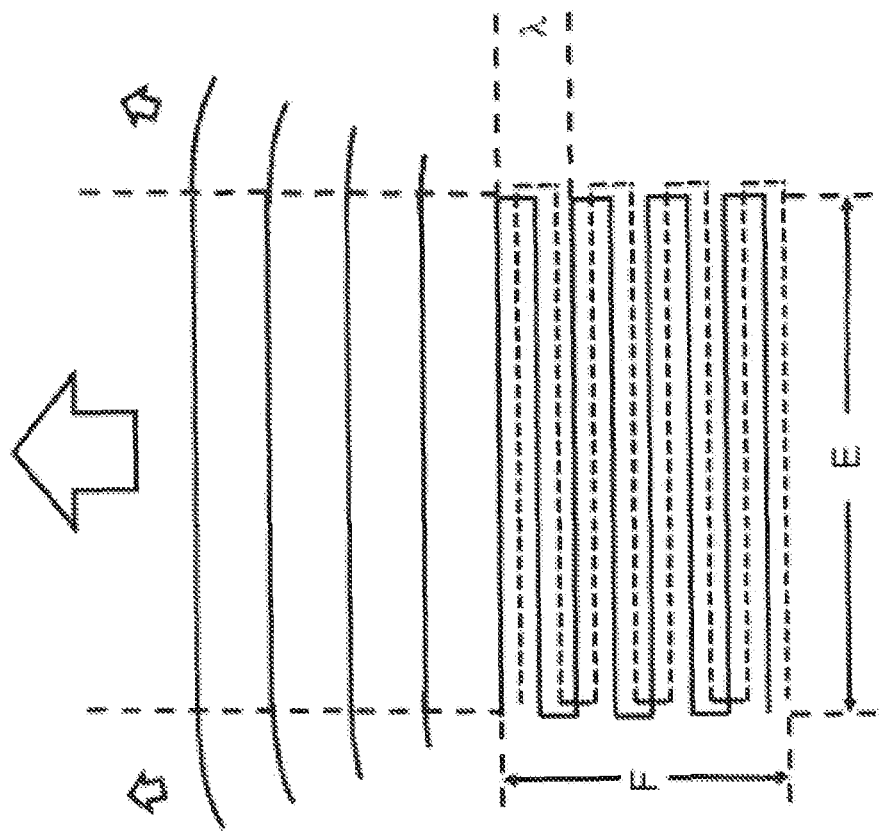

In FIG. 5, two conductor arrangements are sketched in an exemplary manner as examples of a phased-array setup based on EMAT in an "unrolled" position, which can function as emitting transducer 2 and/or receiving transducer 4 and have an extension E which is aligned in parallel to the circumferential direction U of the object 6 if the conductor arrangements are arranged on or in the vicinity of the object wall 10. To obtain a main beam 16 having less divergence, the emitting transducer 2 and/or the receiving transducer 4 has an extension E in the circumferential direction U which is 3 times to 10 times the wavelength λ, preferably 4 times to 8 times the wavelength λ of the ultrasonic wave 8.

Figure 6:
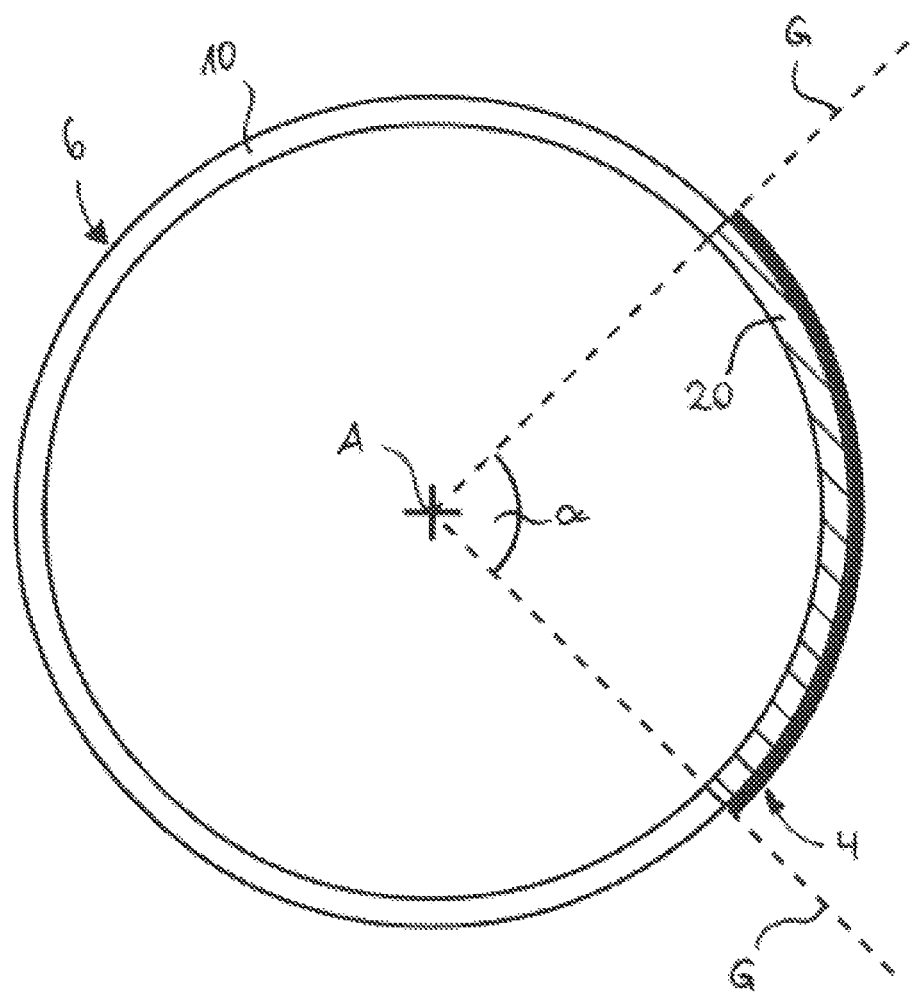
FIG. 6 shows a further schematic sketch according to the invention.

FIG. 6 is used to illustrate the term "sector" or "sector width" 20 and shows a tubular object 6 from a perspective in its longitudinal direction. By way of example, a receiving transducer 4 occupies a sector 20 (shaded) of 90° or has a sector width 20 of 90° if the angle α between the straight lines G is 90°.

Figure 7:
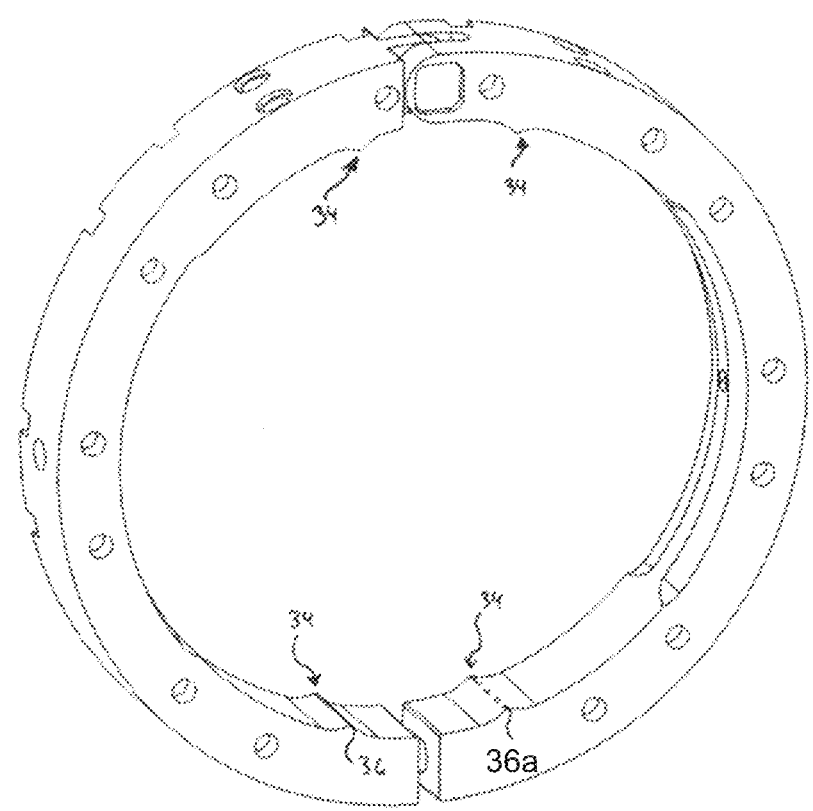
FIG. 7 shows an element of the flow meter according to the invention.

A fastening ring 32 of the sensor mechanism is shown in FIG. 7. The fastening ring 32 has contact means 34, which each form a linear contact point 36 extending in the longitudinal direction of the object 6 for contact on the object 6. FIG. 7 illustrates a contact point 36a comprising multiple punctiform contact points arranged in series or in succession in the longitudinal direction of the object 6.

FIG. 8 shows a simulation result of a propagating ultrasonic wave in a tubular object (projected illustration). The horizontal axis corresponds to the longitudinal direction of the object, the vertical axis to the circumferential direction U. The longitudinal wave propagates in the longitudinal direction of the object (propagation direction B), the main beam thereof extends centrally. On both sides, a side lobe of the longitudinal wave departs in each case (respective propagation of the side lobe highlighted by a white arrow). In the further course, these lobes extend in opposite directions around the longitudinal axis of the object and are detected by the receiving transducer, wherein the side lobe signal is used as a reference signal in the evaluation of the useful signal to determine the flow or the flow rate.

The invention claimed is:

1. A method for noninvasive determination of the flow or the flow rate in an electrically conductive object, through which a gaseous medium flows, by an acoustic flow meter comprising a sensor mechanism having two contact points with the object, wherein an emitting transducer of the flow meter is arranged on or close to an object wall and a receiving transducer of the flow meter is arranged spaced apart from the emitting transducer in a longitudinal direction of the object on or close to the object wall, an ultrasonic wave, is generated in the object by means of the emitting transducer, which is partially coupled as a longitudinal wave into the medium, and a useful signal, which at least partially results due to the longitudinal wave, is detected by the receiving transducer, wherein the flow or the flow rate is determined from the useful signal via an evaluation device, wherein the emitting transducer is arranged in a first position in the circumferential direction around a longitudinal axis of the object and the receiving transducer is arranged in a second position, varied in relation to the first position around the longitudinal axis, outside a main beam of the ultrasonic wave, and a width of the main beam of the ultrasonic wave is restricted to a sector between the two contact points of the sensor mechanism, wherein the contact points are arranged behind the receiving transducer with respect to the main beam and in the propagation direction of the ultrasonic wave.

2. The method of claim 1, wherein a conductor arrangement is used as the emitting and/or receiving transducer, which is designed both to emit the ultrasonic wave and to receive the useful signal, and measurement is performed both in the direction of the flow and in the opposite direction to determine the flow or the flow rate.

3. A method for noninvasive determination of the flow or the flow rate in an electrically conductive object, through which at least one gaseous medium flows, by an acoustic flow meter comprising a sensor mechanism having two contact points with the object, wherein an emitting transducer of the flow meter is arranged on or close to an object wall and a receiving transducer of the flow meter is arranged spaced apart from the emitting transducer in a longitudinal direction of the object on or close to the object wall, an ultrasonic wave, propagating in the longitudinal direction and having at least one side lobe, is generated in the object by the emitting transducer, which ultrasonic wave is partially coupled as a longitudinal wave into the medium, and a useful signal, which at least partially results due to the longitudinal wave, is detected by the receiving transducer, wherein the flow or the flow rate is determined from the useful signal via an evaluation device, wherein the receiving transducer detects the at least one side lobe of the ultrasonic wave in addition to the useful signal, and at least one side lobe signal is used as a reference signal in an evaluation of the useful signal to determine the flow or the flow rate.

4. The method of claim 3, wherein the emitting and receiving transducers are designed in such a way that the side lobe signal and useful signal are amplified for the evaluation, wherein the amplification factors are in the same order of magnitude.

5. The method of claim 3, wherein the at least one side lobe comprises two side lobes extending in opposite directions around a longitudinal axis, the receiving transducer is positioned in the longitudinal direction such that amplitudes of the two side lobes are superimposed at the receiving transducer.

6. The method of claim 3, wherein the receiving transducer is positioned opposite to the emitting transducer from a perspective in the longitudinal direction of the object.

7. The method of claim 3, wherein a width of a main beam of the ultrasonic wave is restricted to a sector width of less than 120° in a circumferential direction at a longitudinal position of the receiving transducer via a phased-array setup of the emitting transducer.

8. The method of claim 3, wherein the receiving transducer is positioned at a distance (d1) less than D/2 from a contact point of a sensor mechanism with respect to the longitudinal direction of the object.

9. The method of claim 3, wherein a center point of the receiving transducer is positioned at a distance (d2) less than 1.5*D from a contact point of a sensor mechanism with respect to the longitudinal direction of the object.

10. The method of claim 3, wherein, to generate the ultrasonic wave in the object, a static or quasi-static first magnetic field is generated, which interacts with a varying further magnetic field generated by the emitting transducer in a surface-proximal region of the object.

11. The method of claim 3, wherein one pair of emitting and receiving transducers, on the one hand, and a further pair of emitting and receiving transducers, on the other hand, are arranged on the object and measurement is performed both in the direction of the flow and in the opposite direction to determine the flow or the flow rate.

12. The method of claim 3, wherein the emitting and/or receiving transducer is operated in a frequency range of 50 kHz to 300 kHz.

13. An acoustic flow meter for noninvasive determination of the flow or the flow rate in an electrically conductive object, through which a gaseous medium flows, having an emitting transducer to be positioned on or close to the object wall and a receiving transducer to be arranged spaced apart from the emitting transducer in a longitudinal direction of the object on or close to an object wall, wherein the flow meter is designed to generate an ultrasonic wave, in the object and to detect a useful signal, having a sensor mechanism for connecting the flow meter to the object, said sensor mechanism including contact means for contacting the object, and having an evaluation device, by means of which the flow or the flow rate is determinable from the useful signal, wherein the emitting transducer is arranged in a first position in a circumferential direction around a longitudinal axis of the object, and the receiving transducer is arranged in a second position, which is varied in relation to the first position around the longitudinal axis, outside a main beam of the ultrasonic wave, wherein the receiving transducer and the emitting transducer have a sector width less than 120° with respect to the longitudinal axis of the object to be arranged between them, and the contact means of the sensor mechanism, viewed in the direction of the longitudinal axis, are arranged outside the sectors spanned by the receiving transducer and the emitting transducer.

14. The device of claim 13, wherein, viewed from the emitting to the receiving transducer and with respect to the longitudinal axis of the object, the contact means are arranged behind the receiving transducer.

15. The device of claim 13, wherein the emitting and/or or receiving transducer has an extension in the circumferential direction which is 3 times to 10 times a wavelength of the ultrasonic wave.

16. The device of claim 15, wherein the extension of the emitting or receiving transducer is 25 mm to 150 mm, and a width of the emitting and/or receiving transducer extending perpendicularly to the extension is 75 mm to 100 mm.

17. The device of claim 13, wherein the emitting or receiving transducer is designed corresponding to a wavelength in the range of 5 mm to 20 mm.

18. The device of claim 13, wherein the receiving transducer is arranged at a distance (d1) less than D/2 from the contact point means of the sensor mechanism with in the longitudinal direction of the object.

19. The device of claim 13, wherein a center point of the receiving transducer is positioned at a distance (d2) less than 1.5*D from the contact point means of the sensor mechanism with respect to a in the longitudinal direction of the object.

20. The device of claim 13, wherein the emitting or the receiving transducers are formed by a conductor arrangement, which is designed both to emit the ultrasonic wave and also to receive the useful signal.

21. The device of claim 13, wherein the contact means includes at least one linear contact point, extending in the longitudinal direction of the object, for contact on the object.

22. The device of claim 13, wherein at least one the contact means forms includes at least one punctiform contact point for contacting the object.

23. The device of claim 13, wherein the contact means consists of a hard material, including metal.

\* \* \* \* \*